No. 746,327. PATENTED DEC. 8, 1903.
H. W. HALES.
PHOTOGRAPHIC CAMERA.
APPLICATION FILED MAR. 25, 1903.
NO MODEL. 3 SHEETS—SHEET 2.
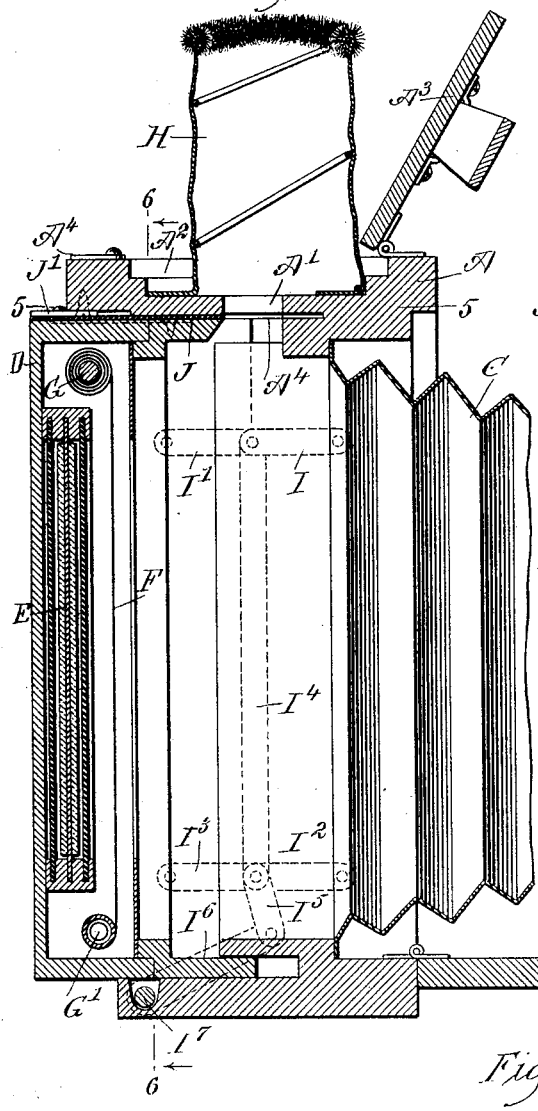
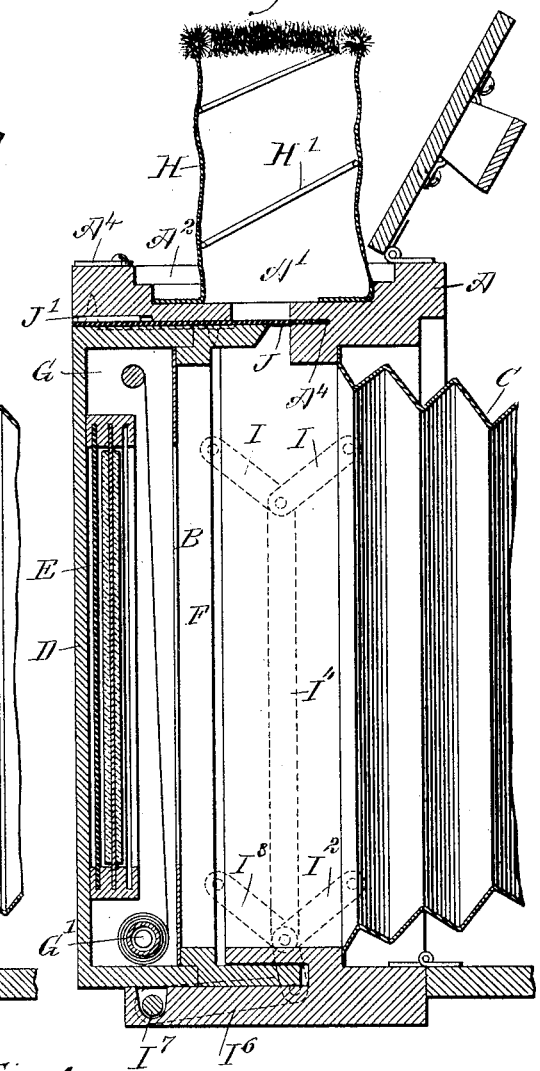
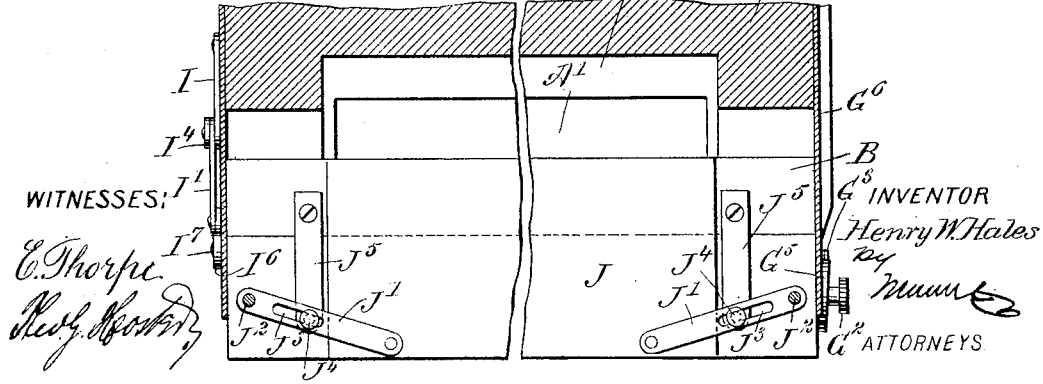

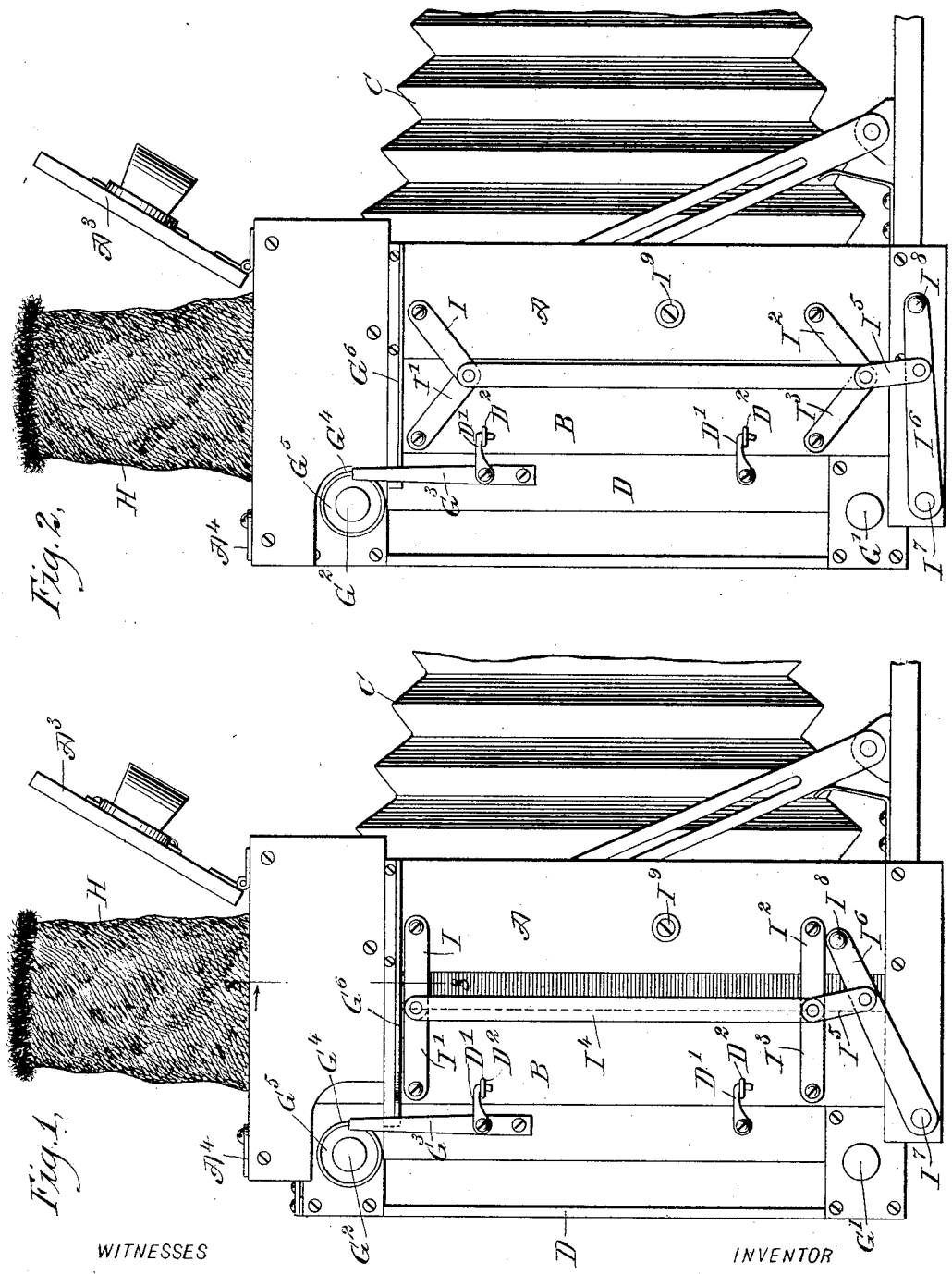

No. 746,327. PATENTED DEC. 8, 1903.
H. W. HALES.
PHOTOGRAPHIC CAMERA.
APPLICATION FILED MAR. 25, 1903.
NO MODEL. 3 SHEETS—SHEET 3.
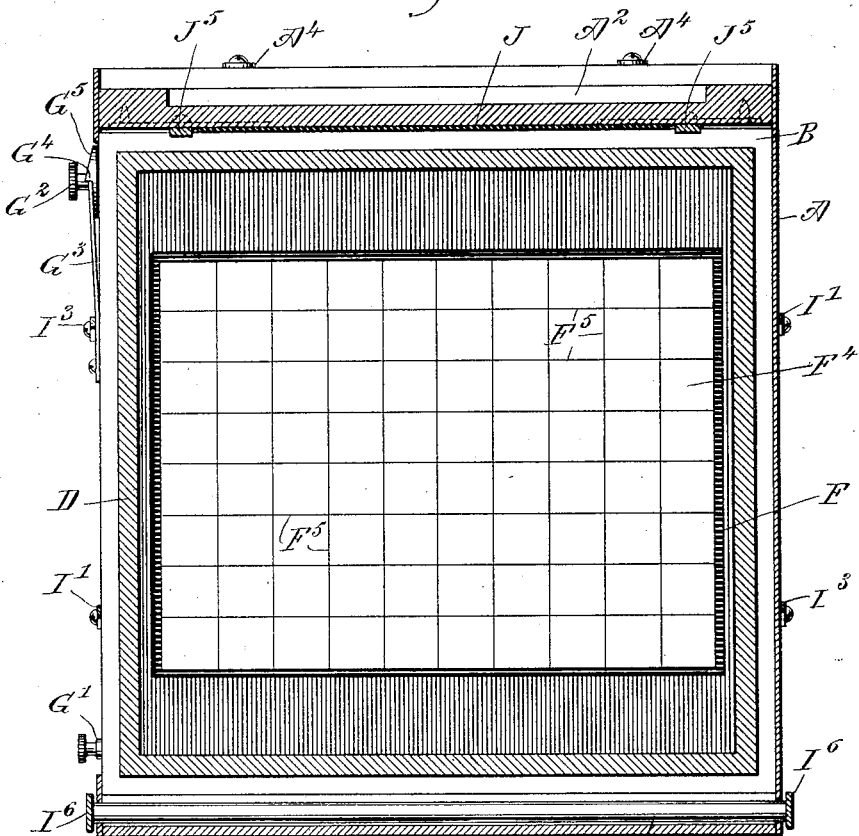
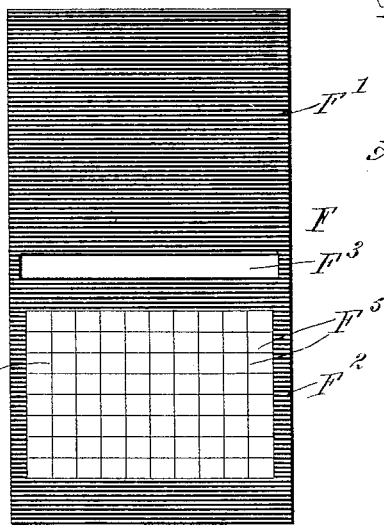
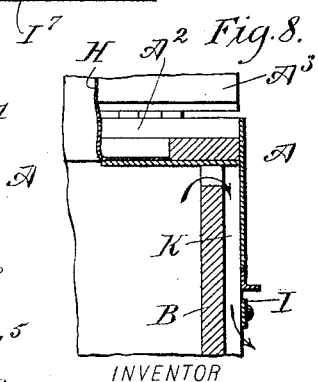
WITNESSES
Edward Thorpe
Theo. G. Hoster
INVENTOR
Henry W. Hales
BY
ATTORNEYS.

No. 746,327. Patented December 8, 1903.

UNITED STATES PATENT OFFICE.

HENRY W. HALES, OF RIDGEWOOD, NEW JERSEY.

PHOTOGRAPHIC CAMERA.

SPECIFICATION forming part of Letters Patent No. 746,327, dated December 8, 1903.

Application filed March 25, 1903. Serial No. 149,451. (No model.)

*To all whom it may concern:*

Be it known that I, HENRY W. HALES, a citizen of the United States, and a resident of Ridgewood, in the county of Bergen and State of New Jersey, have invented a new and Improved Photographic Camera, of which the following is a full, clear, and exact description.

The object of the invention is to provide a new and improved photographic camera arranged to produce an exceedingly sharp and brilliant image on the focusing medium and subsequently on the sensitive plate or film in such a manner that the operator while focusing can view the image right side up or non-inverted.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement, showing the parts in position for focusing. Fig. 2 is a like view of the same, showing the parts in position after making an exposure. Fig. 3 is a longitudinal sectional elevation of the improvement, the parts being in the position illustrated in Fig. 1. Fig. 4 is a like view of the same, the parts being in the position shown in Fig. 2. Fig. 5 is a sectional plan view of the improvement on the line 5 5 of Fig. 3. Fig. 6 is a transverse section of the improvement on the line 6 6 of Fig. 3. Fig. 7 is a reduced face view of the focal-plane shutter extended; and Fig. 8 is a transverse section of part of the improvement, showing the light-proof air-vent, the section being on the line 8 8 of Fig. 1.

Modern anastigmat-lenses have such fine optical qualities that the ordinary cameras fail to show the extreme or microscopic sharpness of the image, and consequently such cameras do not give the results that the lenses referred to are capable of producing. In ordinary cameras in which a ground glass is used for focusing purposes the so-called "grain" of the glass interferes with the fineness of the image, and the reflection caused by the glass also affects the sharpness of the image. In cameras in which a plate or flat surface is provided in front of the exposing-shutter of the roller blind or curtain type it has been usual to use a mirror to reflect the image; but this is objectionable, as the rays of light frequently travel two or three times the focal length of the lens, and any slight refraction from the mirror or aberration of rays from any source is thus intensified.

In order to overcome the objections referred to, the following improvements are provided: The camera-casing, as illustrated in the drawings, is made in two sections A and B movable toward and from each other, and of which the front section A carries a bellows C and the objective or lens, (not shown,) while the rear section B supports a removable reversible back D for holding a plate or film holder E and a focal-plane or curtain shutter F.

The focal-plane or curtain shutter F consists of opaque portions $F'$ and $F^2$ and an aperture or transverse slot $F^3$, extending between the said portions, the aperture allowing the rays of light from the lens to be transmitted to and act upon the sensitive surface of the plate or film in the usual manner at the time the shutter is traveling or moving during the exposing period. The front face of the curtain-shutter portion $F^2$ (see Figs. 6 and 7) has a focusing-field $F^4$ in front of and corresponding to the sensitive surface of the plate or film to be exposed, and the said field $F^4$ is preferably of a white or light color and is equal in size to the largest plate or film for use in the camera, and the said field is surrounded by a contrasting color, preferably black or red, to prevent the reflection of the rays of light. On the field $F^4$ are arranged guide-marks $F^5$, preferably in the shape of horizontal and vertical lines, to enable the operator in viewing the curtain-screen to define and locate with the greatest accuracy the image projected by the lens onto the field.

The focal-plane or curtain shutter is secured at its ends on rollers G and $G'$, journaled in the upper and lower portions of the reversible back D, (see Figs. 3 and 4,) and the lower roller $G'$ is preferably of the spring-roller type, which acts to wind the curtain-shutter F after the focusing has taken place and causes the exposure to be made on moving the sections A and B toward each other, as hereinafter more fully described. Previous to focusing the shutter F is wound up on the roller G by the operator turning a knob $G^2$ until the lower portion $F^2$ of the shutter extends between the rollers and is in front of the plate or film holder E, as indicated in Figs. 3 and 6. While winding up the curtain on the roller G it unwinds on the lower roller $G'$, which on turning places its spring under tension. The roller G is now locked against return movement by a spring-arm $G^3$, attached to the section B at the outside thereof, and the said spring-arm engages a shoulder $G^4$ on a cam-disk $G^5$, secured on the shaft of the roller G immediately in the rear of the knob $G^2$. When the spring-arm $G^3$ is thrown out of engagement with the shoulder $G^4$, then the shutter F is released, and the roller $G'$ by the tension of its spring is rotated to wind up the shutter F, and in doing so the aperture $F^3$ travels in front of the sensitive surface, and thereby admits the rays of light from the lens to the said surface to make the desired exposure.

In order to enable the operator to view the image right side up or non-inverted at the time the portion $F^2$ of the shutter is in front of the film or plate holder E, as indicated in Fig. 3, the following device is provided: On the top of the front section A is arranged a flexible collapsible hood H, leading at its lower end to an opening $A'$, formed in the top of the front section A, to allow the operator to look into the hood to view the image projected by the lens on the focusing-field $F^4$ of the focal-plane or curtain shutter, and as the observer looks downward onto the image the latter appears in a right-side-up or non-inverted position to the eyes of the observer.

By having the hood flexible, supported expansively by a light wire spring and secured at its lower end to the top of the section A, it is evident that the observer can readily move the hood while in contact with the head on the outer end sidewise or toward the front or toward the rear to enable the eyes of the observer to properly view the projected image on the field $F^4$, and thereby allow the observer to thoroughly scrutinize the image in all its minute parts.

When the camera is not in use, the hood H is pressed downward and conveniently folded into a recess $A^2$, formed in the top of the section A, and the hood in the folded position is then locked in place in the recess $A^2$ by a hinged cover $A^3$, adapted to be locked in a closed position by a catch $A^4$. The hood is preferably provided with a spring $H'$ to normally hold the hood in an upward extended position when the camera is in use, as indicated in Figs. 1, 2, 3, and 4.

In order to move the casing-sections A and B toward and from each other, the following device is provided: On both outer sides of the sections A and B are fulcrumed the pairs of links I $I'$ and $I^2$ $I^3$, connected with each other on each side of the casing by a bar $I^4$, and the bars on the two sides of the casing are pivotally connected by links $I^5$ with lever-arms $I^6$, secured on a shaft $I^7$, extending transversely and journaled in suitable bearings held on the bottom of the section A. On the forward end of one of the lever-arms $I^6$ is arranged a handle $I^8$, located opposite a finger-piece $I^9$ and projecting from the section A of the casing, as plainly indicated in Figs. 1 and 2, so that the operator can conveniently take hold of the finger-piece $I^9$ and the handle $I^8$ to exert pressure on the handle $I^8$ to swing the lever-arms $I^6$ upward, whereby a corresponding movement is given by the links $I^5$ to the bars $1^4$ to swing the pairs of links I $I'$ and $I^2$ $I^3$ into an open position, as plainly shown in Fig. 1, and the said links in moving in this position move the sections A and B apart or from each other. When pushing the handle $I^8$ downward, the pairs of links I $I'$ and $I^2$ $I^3$ swing into an angular position, as shown in Fig. 2, and in doing so the sections A and B are drawn toward each other. The extent of movement in moving the sections apart or toward each other corresponds to the distance between the outer face of the focal-plane or curtain shutter F and the sensitive surface of the plate or film in the holder E, and hence when the image is properly focused on the field $F^4$, as previously explained, and at the time the sections A and B are apart and the operator moves the sections toward each other then the sensitive face of the plate or film moves exactly into the position previously occupied by the field $F^4$, and consequently the exposure is properly made at the time the shutter F moves in a downward direction, and its aperture $F^3$ allows the rays of light to pass onto the sensitive surface.

The shutter F is moved into focusing position at the time the sections A and B are moved from each other, and when the sections are moved toward each other, as above explained, then the shutter is automatically unlocked, and for this purpose the section A is provided on one side with a longitudinally-extending fixed cam $G^6$, adapted to engage the spring-arm $G^3$ and move the same out of engagement with the shoulder $G^4$ at the time the sections A and B move into a final position toward each other, and as soon as the spring-arm $G^3$ disengages the shoulder $G^4$ then the spring of the roller $G'$ turns the latter and the focal-plane or curtain shutter F is wound upon the said roller $G'$ and unwound from the roller G for the purpose above explained.

At the time the sections move toward each other, but before they have finally moved into a closing position, the said opening $A'$ is automatically closed by a shutter J in the form of a plate held on the top of the section B and adapted to slide in a groove $A^5$, formed in the top of the section A. This shutter-plate J is provided with links $J'$, (see Fig. 5,) pivotally connected at $J^2$ with the top of the section A, and the said links J' are provided between their ends with elongated slots J³, engaged by pins J⁴, held on brackets J⁵, secured to the top of the section B, so that when the sections move toward each other the links J' are caused to swing, and in doing so move the shutter-plate J inwardly to close the opening A'. (See Fig. 4.)

The reversible back D is removably and reversibly held on the section B, and for this purpose the reversible back is provided with hooks D', engaging staples D², formed on the section B, as plainly indicated in Figs. 1 and 2.

In order to enable the air to escape from the camera at the time the sections A and B are moved toward each other, light-proof air-vents are provided in the form of air-passages K, arranged in the upper portions of the sides of the sections, as plainly indicated in Fig. 8.

The operation is as follows: The plate-holder E being in position in the reversible back D, attached to the section B, the operator draws out the front end of the bellows of the camera to the approximate focusing position. Then the hood H is extended, as shown in the drawings, to allow the operator to view the image projected by the lens onto the field F⁴. The sections A and B are moved from each other, as previously explained. Then the operator turns the knob B² to wind up the upper portion F' of the focal-plane or curtain shutter on the roller G, so that the lower portion F², with the field F⁴, is in focusing position. When this has been done, the operator withdraws the slide of the plate-holder E to prepare for an exposure and next manipulates the camera and lens in the usual manner to bring the image to a proper sharp focus on the field F⁴ and then moves the sections A and B toward each other, as before explained, so that the plate J closes the opening A' and the spring-arm G³ is moved out of engagement with the shoulder G⁴, thereby releasing the focal-plane or curtain shutter, thus causing the exposure to be made by the action of the spring-roller G' of the shutter.

From the foregoing it will be seen that by the arrangement described it is not necessary to close the hood H and cover A³ while making the exposure, as the plate J closes the opening A' previous to the aperture F³ traveling over the field of exposure. It will further be seen that the air liable to be compressed on moving the sections A and B toward each other can freely escape through the air-passages K, (shown in Fig. 8,) and hence the air is not liable to vibrate the bellows or from a quick pulsation to jar the objective. It will also be seen that by the arrangement described the reversible back containing the plate or film holder can be readily reversed without increasing the size of the camera, and as the actuating mechanisms are all on the outside of the camera they are accessible at all times to the operator.

Having thus described my invention, I claim as new and desire to secure by Letters Patent—

1. A photographic camera provided with a carrier for a sensitive plate or film, a focal plane or curtain shutter forming a focusing medium, and means for moving the said carrier, to bring the sensitive surface of the plate or film into the position previously occupied by the focusing portion of the said focal-plane or curtain shutter, as set forth.

2. A photographic camera provided with a carrier for a sensitive plate or film, a focal-plane or curtain shutter having an aperture for the passage of light to the sensitive surface of the plate or film and an opaque portion for covering the sensitive surface previous to an exposure and for forming a focusing medium, and means under the control of the operator, for successively actuating the said carrier and the said focal-plane or curtain shutter, whereby the opaque portion of the shutter is moved out of the focusing-field, and the sensitized surface of the plate or film is moved to the position previously occupied by the focusing-field of the curtain or shutter, as set forth.

3. A photographic camera provided with a casing made in sections movable toward and from each other, one of the sections carrying a sensitive plate or film, and a focal-plane or curtain shutter forming a focusing medium, as set forth.

4. A photographic camera provided with a camera-casing made in sections movable toward and from each other, one of the sections forming a carrier for the sensitive plate or film, and a focal-plane or curtain shutter also carried by the said carrier-section and forming a protection for the plate or film and a focusing medium, the sections when moved toward each other bring the sensitive surface of the plate or film into the position previously occupied by the focusing portion of the said focal-plane or curtain shutter, as set forth.

5. A photographic camera provided with a camera-casing made in sections movable toward and from each other, one of the sections forming a carrier for the sensitive plate or film, and a focal-plane or curtain shutter also carried by the said carrier-section and forming a protection for the plate or film and a focusing medium, the sections when moved toward each other bring the sensitive surface of the plate or film into the position previously occupied by the focusing portion of the said focal-plane or curtain shutter, and means external of the casing and under the control of the operator for moving the said sections toward and from each other, and for releasing the said focal-plane or curtain shutter, as set forth.

6. A photographic camera provided with a casing made in sections, movable toward and from each other, one of the sections carrying a lens and the other a sensitive plate or film, a curtain-shutter forming a protection for the plate or film and a focusing medium, manually-controlled means for moving the sections toward and from each other, and an automatic releasing device for the said curtain-shutter, to automatically release the latter on moving the sections toward each other.

7. A photographic camera provided with a casing made in sections, movable toward and from each other, the front section carrying a lens and the rear section carrying a sensitive film or plate and a focal-plane or curtain shutter, forming a focusing medium, and manually-controlled means for moving the sections toward each other, to bring the sensitive surface of the plate or film into the position previously occupied by the focusing portion of the curtain-shutter, as set forth.

8. A photographic camera provided with a casing made in sections, means for moving the sections toward and from each other, a focal-plane or curtain shutter in one of the sections, and a releasing device for the said shutter, actuated when moving the sections toward each other.

9. A photographic camera provided with a casing made in sections, means for moving the sections toward and from each other, a focal-plane or curtain shutter in one of the sections, a releasing device for the said shutter, actuated when moving the sections toward each other, a hood for viewing, a focusing-face on the front of the curtain-shutter, and a light cut-off for the said hood, actuated automatically with the said casing-sections.

10. A photographic camera having a casing made in sections, means outside of the casing for moving the sections toward and from each other, a focusing curtain-shutter in one of the sections, a hood on the other section, for viewing the focusing-face of the shutter, and an automatic light-cut-off plate, moving with the sections and adapted to open and close the hood to the said shutter.

11. A photographic camera having a casing made in sections movable toward and from each other, links arranged in pairs and connected with the said sections, a bar connecting the pairs of links with each other, and a lever under the control of the operator, fulcrumed on one section and connected with the said bar, as set forth.

12. A photographic camera having a casing made in sections movable toward and from each other, links arranged in pairs and connected with the said sections, a bar connecting the pairs of links with each other, a lever under the control of the operator, fulcrumed on one section and connected with the said bar, and a fixed finger-piece on the said section, opposite the handle end of the said lever, as set forth.

13. A photographic camera having a casing made in sections, movable toward and from each other, a curtain-shutter mounted in one of the sections, a cam-disk on the shaft of one of the rollers of the curtain-shutter, a spring-arm for engaging and locking the said cam-disk, and an incline fixed on the other casing-section and adapted to move the said spring-arm out of engagement with the said cam-disk, to release the shutter on moving the casing-sections toward each other, as set forth.

14. A photographic camera provided with a focusing curtain-shutter in front of the sensitive plate or film, a flexible hood for viewing the front face of the said shutter and a sliding plate for closing the hood-aperture to the shutter.

15. A photographic camera made in sections movable toward and from each other and provided with light-proof air-vents in the form of air-passages in the upper portions of the sides of the sections, as set forth.

In testimony whereof I have signed my name to this specification in the presence of two subscribing witnesses.

HENRY W. HALES.

Witnesses:
F. W. HANAFORD,
EVERARD BOLTON MARSHALL.